Figure 1:
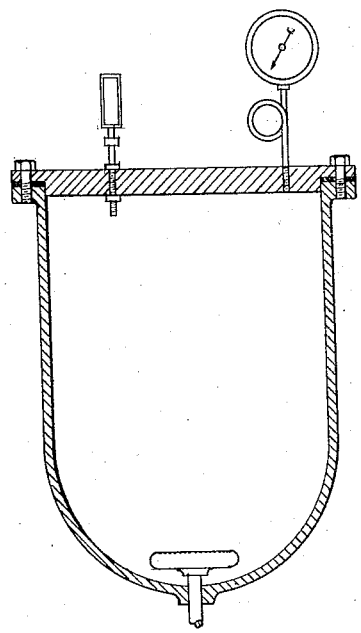

A. L. STARK.
PRECIPITATED ANTIMONY SULPHIDE AND METHOD OF MAKING SAME.
APPLICATION FILED SEPT. 17, 1921.

1,415,127. Patented May 9, 1922.

Inventor
Arthur L. Stark
By Fay, Oberlin & Fay
Attorneys

UNITED STATES PATENT OFFICE.

ARTHUR L. STARK, OF ELYRIA, OHIO, ASSIGNOR TO THE STIBIUM PRODUCTS COMPANY, OF ELYRIA, OHIO, A CORPORATION OF OHIO.

PRECIPITATED ANTIMONY SULPHIDE AND METHOD OF MAKING SAME.

1,415,127.  Specification of Letters Patent.  Patented May 9, 1922.

Application filed September 17, 1921. Serial No. 501,360.

*To all whom it may concern:*

Be it known that I, ARTHUR L. STARK, a citizen of the United States, and a resident of Elyria, county of Lorain, and State of Ohio, have invented a new and useful Improvement in Precipitated Antimony Sulphide and Methods of Making Same, of which the following is a specification, the principle of the invention being herein explained and the best mode in which I have contemplated applying that principle, so as to distinguish it from other inventions.

Such precipitated sulphide is generally known in the trade as antimony sulphuret in contradistinction to the natural or fused article, being employed to a large extent for vulcanizing and imparting a red color to rubber or caoutchouc. Such precipitated sulphide consists of antimonic sulphide or penta-sulphide ($Sb_2S_5$), or a mixture of such penta-sulphide with antimonous sulphide or tri-sulphide ($Sb_2S_3$), the penta-sulphide forming an orange red powder, which decomposes into tri-sulphide and sulphur on heating.

In my co-pending applications, Serial No. 337,408, filed November 12, 1919, and Serial No. 385,641, filed June 1, 1920, I describe and claim several methods for making the aforesaid precipitated antimony sulphide by mixing finely ground stibnite or needle antimony, (which is the commercial available form of raw material derived from the naturally occurring gray antimony ore and consists essentially of the tri-sulphide), with sulphur and a compound capable of forming a water-soluble double salt with antimony, together with water, and then heating under pressure at an elevated temperature. As compounds suitable for the purpose in question I have heretofore employed quicklime (CaO), barium oxide (BaO) and strontium oxide (SrO), which may be generically referred to as oxides of the alkaline earth metals, it being understood that these, as a matter of fact, are converted promptly into the corresponding hydrates as the result of the addition of water as called for by the process. I have also found that corresponding oxygen compounds of the alkali metals are satisfactory for the purpose, for example potassium hydrate (KOH), sodium hydrate (NaOH) and lithium hydroxide (LiOH).

I have now discovered that sulphur compounds of the metals named above, and particularly of barium and calcium, for example, barium sulphide (BaS) and calcium polysulphide ($CaS_x$), may be employed in carrying out my aforesaid process with even more gratifying results than where the oxides or hydrates of said metals are used.

The invention, then, consists of the steps hereinafter fully described and particularly pointed out in the claims, the annexed drawing and the following description disclosing but several of the various ways in which the principle of the invention may be carried out.

In said annexed drawing:—

Figure 2:
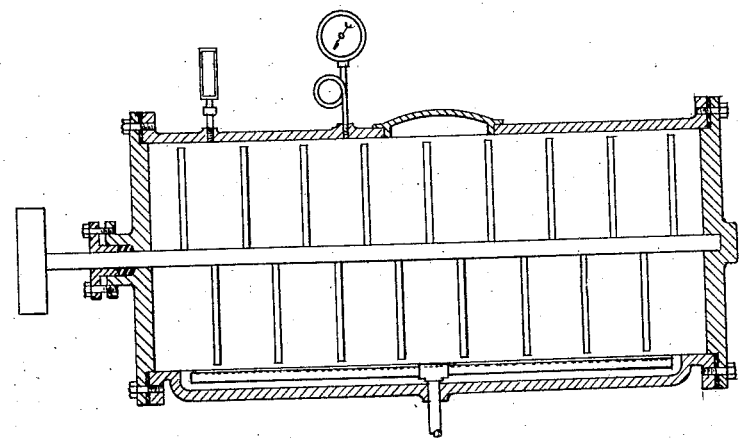

Fig. 1 is a more or less diagrammatic representation of one form of apparatus, specifically a vertically disposed autoclave or digester suitable for carrying out my present improved process; while Fig. 2 is a similar representation of a horizontal digester.

In carrying out my process the crude antimony tri-sulphide or stibnite is first ground to a fine impalpable powder. Thereupon, sulphur and the sulphide of one of the metals named, such metal being capable of forming a double soluble salt with antimony, is added. As best suited, for the reason presently to be explained, I employ barium sulphide. Both the sulphur and such sulphide are in powder form and are thoroughly intermixed with each other and with the powdered stibnite; whereupon the mixture is gradually moistened with water until a paste or slightly fluid mass is formed. Following this, a quantity of the mixture thus prepared is placed, with more water, in an autoclave or digester, either of the vertical type illustrated in Fig. 1, or of the horizontal type shown in Fig. 2, and boiled under pressure at a high temperature. Where the vertical type of autoclave is used the steam is preferably interjected at the bottom, and not only serves to bring the mixture to the desired temperature, but also to agitate the same, while with the horizontal type of apparatus mechanical means are necessary in order to insure thorough agitation of the mass. The treatment in question is continued until substantially all of the solid constituents have been converted into the water-soluble double salt of antimony, e. g., double antimony barium sulphide ($Sb_2S_3.xBaS_x$) where barium sulphide is the compound employed.

The solution thus obtained is then removed and, upon addition to a suitable acid, (either hydrochloric or sulphuric acid may be used, although the latter is preferred) the desired antimony sulphuret, consisting principally, if not altogether, of the penta-sulphide, is precipitated out in the form of a very fine impalpable powder. Where such precipitation is carried out with the use of sulphuric acid, barium sulphate is formed along with such antimony penta-sulphide, and I have found that the latter is apparently precipitated onto the former in an extremely fine state of subdivision. The barium sulphate is itself in a very fine state of subdivision and is entirely covered with a coating of a penta-sulphide, so that it is impossible to see any of the sulphate not thus covered.

As indicated, the reaction whereby the water-soluble double sulphide of antimony and barium, or other equivalent metal is formed, requires to be conducted under conditions of increased temperature due to pressure applied in the digester; for example, 145 degrees to 155 degrees C. with a corresponding pressure of approximately 60 to 80 lbs., will produce satisfactory results. The following is a typical formula for carrying out the reaction, viz,

| | |
|---|---|
| Barium sulphide (commercial 60%) | 3 lbs. |
| Stibnite or antimony sulphide | 1 lb. |
| Sulphur | 1 lb. |

Another formula for carrying out the reaction is as follows, viz,

| | |
|---|---|
| Barium sulphide | 3 lbs. |
| Sodium hydrate (76%) | 1 lb. |
| Stibnite or antimony sulphide | 2 lbs. |
| Sulphur | 2 lbs. |

In the case of the second formula the sodium hydrate or caustic soda in connection with the sulphur increases the content of soluble sulphur, giving a higher percentage of free sulphur in the sulphuret, as well as increasing the percentage of antimony in the latter.

The above formulas will serve equally as a guide where calcium sulphide, instead of barium sulphide, is employed, and instead of a sulphide of one of the so-called alkaline earth metals, an alkali metal sulphide may be utilized, as previously indicated. By my improved process, not only is a more complete absorption of the raw materials, i. e., of the stibnite, sulphur and third ingredient secured, so that very little of such material is lost in the form of sludge, but the conversion takes place very rapidly. At the same time, where barium sulphide is employed and the final precipitation effected by means of sulpuric acid a new and highly improved product is obtained, as hereinbefore described.

It will be understood that stibnite is the preferable form of the antimony sulphide used in the process only because it is ordinarily the form most readily and cheaply to be had. However, other forms of the sulphide, whether similarly naturally derived or artificially produced, may be satisfactorily substituted, and the metal itself, or its oxide, $Sb_2O_3$, may be employed if the proper additional amount of sulphur to convert the same into sulphide be included. It will be further understood that the order in which the ingredients are mixed is a matter of indifference, and particularly that it is principally as a matter of convenience in operation that such ingredients are first mixed with a limited quantity of water to form a paste, since they may all be intermixed and added at once to the larger body of water employed in carrying on the reaction in the digester or autoclave.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of making precipitated antimony sulphide, the steps which consist in mixing finely ground stibnite, sulphur and the sulphide of a metal capable of forming a water soluble double salt with antimony together with water, and heating under pressure at an elevated temperature, whereby such water soluble double salt of antimony and such metal is obtained.

2. In a method of making precipitated antimony sulphide, the steps which consist in mixing finely ground stibnite, sulphur and the sulphide of an alkaline earth metal together with water, and heating under pressure at an elevated temperature, whereby such water soluble double salt of antimony and such metal is obtained.

3. In a method of making precipitated antimony sulphide, the steps which consist in mixing finely ground stibnite, sulphur and the sulphide of barium together with water, and heating under pressure at an elevated temperature, whereby a water-soluble double salt of antimony and barium is obtained.

4. In a method of making precipitated antimony sulphide, the steps which consist in mixing finely ground stibnite, sulphur, the sulphide of an alkaline earth metal and an alkali-metal compound together with water, and heating under pressure at an elevated temperature, whereby a water-soluble salt of antimony and such alkaline-earth metal is obtained.

5. In a method of making precipitated antimony sulphide, the steps which consist in mixing finely ground stibnite, sulphur, barium sulphide and an alkali-metal compound together with water, and heating under pressure at an elevated temperature, whereby a water-soluble salt of antimony and barium is obtained.

6. In a method of making precipitated antimony sulphide, the steps which consist in mixing finely ground stibnite, sulphur, barium sulphide and an oxygen compound of an alkali-metal together with water, and heating under pressure at an elevated temperature, whereby a water-soluble salt of antimony and barium is obtained.

7. In a method of making precipitated antimony sulphide, the steps which consist in mixing finely ground stibnite, sulphur and the sulphide of barium together with water, heating under pressure at an elevated temperature, whereby a water-soluble double salt of antimony and barium is obtained, and then adding sulphuric acid whereby antimony-pentasulphide and barium sulphate are precipitated.

8. In a method of making precipitated antimony sulphide, the steps which consist in mixing finely ground stibnite, sulphur, barium sulphide and an oxygen compound of an alkali-metal together with water, heating under pressure at an elevated temperature, whereby a water-soluble salt of antimony and barium is obtained, and then adding sulphuric acid whereby antimony-pentasulphide and barium sulphate are precipitated.

9. The new product consisting of antimony penta-sulphide precipitated upon a finely crystallized base, substantially as described.

10. The new product consisting of antimony penta-sulphide precipitated upon finely sub-divided barium sulphate.

11. The new product consisting of finely sub-divided particles of barium sulphate coated with antimony penta-sulphide, likewise in extremely finely sub-divided state.

Signed by me this 13 day of September, 1921.

ARTHUR L. STARK.